United States Patent [19]

Yamamoto et al.

[11] Patent Number: 4,631,172

[45] Date of Patent: Dec. 23, 1986

[54] ALUMINUM ALLOYS FOR GALVANIC ANODE

[75] Inventors: Ikuo Yamamoto, Omiya; Takehito Umino, Hanno; Yoshio Shinoda, Ageo; Hisao Yoshino, Kitamoto, all of Japan

[73] Assignees: Nadagawa Corrosion Protecting Co., Ltd.; Mitsui Mining & Smelting Co., both of Tokyo, Japan

[21] Appl. No.: 729,256

[22] Filed: May 1, 1985

[30] Foreign Application Priority Data

May 8, 1984 [JP] Japan ................................ 59-91486
May 8, 1984 [JP] Japan ................................ 59-91487

[51] Int. Cl.$^4$ ............................................. C22C 21/10
[52] U.S. Cl. ................................... 420/541; 204/148; 204/293; 420/546; 420/549
[58] Field of Search ................... 420/541, 546, 549; 204/148, 197, 293

[56] References Cited

U.S. PATENT DOCUMENTS 4,141,725  2/1979  Murai et al. ........................ 420/541

FOREIGN PATENT DOCUMENTS 14291  8/1967  Japan .
2139   1/1982  Japan .

*Primary Examiner*—L. Dewayne Rutledge
*Assistant Examiner*—Robert L. McDowell
*Attorney, Agent, or Firm*—Felfe & Lynch

[57] ABSTRACT

Alloys for galvanic anode of this invention include those which contain zinc of 1.0 to 10%, magnesium of 0.1 to 6%, indium of 0.01 to 0.04%, tin of 0.005 to 0.15%, silicon of 0.09 to 1.0%, and calcium or barium or both of 0.005 to 0.45%, the balance being aluminum, and those which contain zinc of 1.0 to 10%, indium of 0.01 to 0.05%, magnesium of 0.05 to 6%, silicon of 0.07 to 1.0%, and calcium or barium or both of 0.01 to 0.5%, the balance being aluminum. The above mentioned alloys of this invention exhibit an exceedingly large output of electric current as compared with conventional alloys, hold the dissolving surfaces uniformly and are exceedingly useful for anticorrosion of large-sized steel structures.

3 Claims, No Drawings

ALUMINUM ALLOYS FOR GALVANIC ANODE

BACKGROUND OF THE INVENTION

1. Field of the Invention

This invention relates to an aluminum alloy for galvanic (sacrificial) anode which is used for cathodic protection of facilities in sea water, vessels and machineries using sea water, and the like.

2. Description of the Prior Art

Normally, aluminum is stable in a neutral solution by virtue of an oxide film, and has a potential less noble than steel. Accordingly, aluminum has been added with various effective elements so that it has a sufficiently base potential and generates a protective electric current as a galvanic anode for use in cathodic protection.

Inventors of the present invention have carried out a series of studies and developments based on alloys which comprise incorporating zinc and indium in aluminum. Consequently, our inventors have previously developed alloys for galvanic anode (Japanese Patent Publication No. 2139/1982) containing zinc of 1.0 to 10%, magnesium of 0.1 to 6%, indium of 0.01 to 0.04%, tin of 0.005 to 0.15% and silicon of 0.09 to 1.0%, the balance being aluminum, and alloys for galvanic anode (Japanese Patent Publication No. 14291/1967) containing zinc of 1.0 to 10%, indium of 0.01 to 0.05% and magnesium of 0.05 to 6%, the balance being aluminum, and both have been patented. The former alloys were effective for increasing the uniformity of anodic dissolution, which had been a somewhat hard point to settle, and which continuing a large current capacity stably for a long period by adding a proper amount of silicon. The latter alloys aimed at uniform dispersion of indium by adding a small amount of magnesium to thereby improve anode performance. Referring to the anode performance of these alloys, the anode potential was in the range of $-1080$ to $-1100$ mV (based on saturated calomel electrode) and the current capacity (effective ampere hour) was about 2400 to 2600 Ahr/Kg.

However, these alloys were not always satisfactory in the current capacity when applied, as anodes, for use to large-sized steel structures as such steel structures come into wide use, and so development of alloy anodes, which are capable of yielding a much more current capacity, has been demanded eagerly.

SUMMARY OF THE INVENTION

It is an object of the present invention to provide aluminum alloys for galvanic anode which are capable of yielding an extremely large available current capacity, maintaining a sufficiently base potential constantly, and having a uniformly dissolved surface indispensable for long-run practice.

That is, according to a first alloy of the present invention, there is provided an aluminum alloy for galvanic anode containing zinc of 1.0 to 10%, magnesium of 0.1 to 6%, indium of 0.01 to 0.04, tin of 0.005 to 0.15% and silicon of 0.09 to 1.0% and further containing calcium or barium or both of 0.005 to 0.45%, the balance being aluminum, and according to a second alloy of the present invention, there is provided an aluminum alloy for galvanic anode containing zinc of 1.0 to 10%, indium of 0.01 to 0.05% and magnesium of 0.05 to 6%, and further containing silicon of 0.07 to 1.0% and calcium or barium or both of 0.01 to 0.5%, the balance being aluminum.

As stated above, the first and second alloys according to the present invention have been obtained by carrying out a series of studies continuously based on the inventions disclosed in the aforesaid published specification. The first alloy is the one disclosed in Japanese Patent Publication No. 2139/1982 Specification which comprises adding a proper amount of Ca and/or Ba to Al-Zn-Mg-In-Sn-Si alloy, and the second alloy is the one disclosed in Japanese Patent Publication No. 14291/1967 Specification which comprises adding a proper amount of Si and Ca and/or Ba to Al-Zn-In-Mg alloy. As described above, the inventors of the present invention have obtained a hitherto unknown finding that addition of Ca or Ba or both to said known alloys increases the current capacity from alloy anodes exceedingly and holds their dissolving surfaces uniformly, and have accomplished the present invention based on this finding.

DETAILED DESCRIPTION OF THE INVENTION

Reasons for limiting components of the alloys according to the present invention will be explained hereinafter.

In the first alloy according to the present invention, silicon is markedly effective for maintaining the dissolving anode surface uniform. If the silicon content is less than 0.09%, it does not improve the uniformity of dissolving anode surface adequately, while if the silicon content is over 1.0%, adhering products increase as dissolution proceeds, uniformity of the dissolving anode surface is damaged, and obtainment of base potential is hindered. If the contents of zinc, magnesium, indium and tin deviate from the aforesaid ranges, namely zinc of 1.0 to 10%, magnesium of 0.1 to 6% (exclusive of the upper limit), indium of 0.01 to 0.04% and tin of 0.005 to 0.15%, the effect of silicon added can not be displayed fully in long-run use, whereby there take place tendencies of lowering anode efficiency and decreasing the current capacity. Addition of silicon improves castability and workability at the time of casting, and further the finished surface appearance of castings is bettered thereby resulting in uniform quality, namely uniform dissolution, of multicomponent alloy. Consequently, self-corrosion is diminished when used as galvanic anode for a long period, electrochemical characteristics of anode are improved.

Calcium is most characterized for the improvement and efficiency of the first alloy, and addition of a proper amount of calcium to said aluminum-zinc-magnesium-indium-tin-silicon alloy markedly increases the current capacity. The optimum content of calcium is 0.005 to 0.45%. If the calcium content is less than 0.005%, the increased of current capacity can not be observed. If the calcium content is over 0.45%, the anode surface will dissolve locally, thereby resulting in such a difficult point that the dissolving behavior becomes unstable.

Addition of barium displays the substantially same effects as addition of calcium does. If a proper amount of barium is added to said aluminum-zinc-magnesium-indium-tin-silicon alloy, it brings about a fine, uniform anode dissolving surface and thus markedly increases the current capacity. The optimum content of barium is the same as that of calcium. If the addition is less than 0.05%, it is fruitless, and if the addition is over 0.45%, it deprives of the anode dissolving surface of uniformity.

As stated above, calcium and barium display the same effects when added to the aluminum-zinc-magnesiumindium-tin-silicon alloy, which constitutes the base of the first alloy according to the present invention, and when both elements coexist, it brings about a greater synergetic effect of both elements. And, the suitable content at that time may be 0.005% to 0.45% in total of both elements, whereby the calcium content and the barium content each can be reduced. Coexistence of these calcium and barium markedly increases the current capacity and at the same time markedly decreases adhesion of products to the anode dissolving surface, whereby it largely contributes to lowering in anode potential and stabilization in the current capacity. If the total content of these calcium and barium is less than 0.005%, the aforesaid effects can not be observed, while said content is over 0.45%, the anode dissolving surface becomes coarse and lacks stability in the anode efficiency.

Next, in the second alloy according to the present invention, silicon exhibits the same function and effect as silicon does in the aforesaid first alloy. For that purpose, the silicon content must be 0.07 to 1.0%. If the zinc content, the indium content and the magnesium content deviate from the aforesaid ranges, namely the range of zinc 1.0 to 10%, the range of indium 0.01 to 0.05% and the range of magnesium 0.05 to 6% (exclusive of the upper limit) respectively, there take place tendencies of lowering anode efficiency and decreasing the current capacity.

As explained in the preceding item of the first alloy, calcium and barium exhibit marked effects in the points of dissolving characteristics and increased current capacity. For that purpose, it is necessary that calcium or barium or both should be contained in an amount of 0.01 to 0.5%. In particular, when both elements coexist, a higher current capacity can be achieved. In this instance, the content of each element should be in the range of 0.005 to 0.3%, and simultaneously the total content thereof should be in the range of 0.01 to 0.5%.

Next, explanation will be made on Examples of alloys according to the present invention.

EXAMPLE 1

The first alloys of the present invention and a comparative alloy which have the compositions shown in Table 1 were each casted into a round bar having a diameter of 20 mm and a length of 120 mm, whose side (20 cm$^2$) was made an anode area. The same was subjected to constant current test where electricity was supplied for 240 hours in 1.5 l of room temperature artificial seawater at rest at the anode current density of 1.0 mA/cm$^2$. The obtained results are as shown in Table 1. It can be seen therefrom that the first alloys of the present invention are exceedingly superior in the current capacity to the comparative alloy, because the former alloys have the current capacity exceeding 2700 Ahr/Kg and the comparative alloy has the current capacity of 2550 Ahr/Kg. In particular, the first alloys containing calcium and barium in optimum amounts were observed to indicate the current capacity exceeding 2800 Ahr/Kg and hold a sufficiently less noble anode potential.

TABLE 1

| Alloy composition (%) | | | | | | | | Current capacity | Anode potential after 240 hr | |
|---|---|---|---|---|---|---|---|---|---|---|
| Al | Zn | Mg | In | Sn | Si | Ca | Ba | (Ahr/Kg) | (mV, SCE) | Remarks |
| Bal. | 3.2 | 1.5 | 0.02 | 0.01 | 0.2 | — | — | 2550 | −1100 | Comparative alloy (Japanese Patent Pub. No. 2139/82) |
| Bal. | 3.2 | 1.5 | 0.02 | 0.01 | 0.2 | 0.004 | — | 2590 | −1100 | |
| Bal. | 3.2 | 1.5 | 0.02 | 0.01 | 0.2 | 0.005 | — | 2710 | −1095 | Our first alloy |
| Bal. | 3.2 | 1.5 | 0.02 | 0.01 | 0.2 | 0.1 | — | 2825 | −1100 | Our first alloy |
| Bal. | 3.2 | 1.5 | 0.02 | 0.01 | 0.2 | 0.45 | — | 2765 | −1095 | Our first alloy |
| Bal. | 3.2 | 1.5 | 0.02 | 0.01 | 0.2 | 1.0 | — | 2615 | −1080 | |
| Bal. | 3.2 | 1.5 | 0.02 | 0.01 | 0.2 | — | 0.004 | 2595 | −1100 | |
| Bal. | 3.2 | 1.5 | 0.02 | 0.01 | 0.2 | — | 0.005 | 2710 | −1100 | Our first alloy |
| Bal. | 3.2 | 1.5 | 0.02 | 0.01 | 0.2 | — | 0.1 | 2820 | −1095 | Our first alloy |
| Bal. | 3.2 | 1.5 | 0.02 | 0.01 | 0.2 | — | 0.45 | 2760 | −1095 | Our first alloy |
| Bal. | 3.2 | 1.5 | 0.02 | 0.01 | 0.2 | — | 1.0 | 2610 | −1090 | |
| Bal. | 3.2 | 1.5 | 0.02 | 0.01 | 0.2 | 0.002 | 0.002 | 2610 | −1080 | |
| Bal. | 3.2 | 1.5 | 0.02 | 0.01 | 0.2 | 0.003 | 0.002 | 2800 | −1100 | Our first alloy |
| Bal. | 3.2 | 1.5 | 0.02 | 0.01 | 0.2 | 0.05 | 0.05 | 2830 | −1100 | Our first alloy |
| Bal. | 3.2 | 1.5 | 0.02 | 0.01 | 0.2 | 0.25 | 0.2 | 2810 | −1095 | Our first alloy |
| Bal. | 3.2 | 1.5 | 0.02 | 0.01 | 0.2 | 0.3 | 0.3 | 2520 | −1050 | |

EXAMPLE 2

The second alloys of the present invention and a comparative alloy which have the compositions shown in Table 2 were each casted into the same round bar as Example 1. The resulting round bars were tested according to the same procedure as Example 1. The obtained results are shown in Table 2. It is evident from those results that the second alloys of the present invention are exceedingly superior in the current capacity and that the alloy systems containing optimum amounts of zinc, magnesium, indium and silicon and further calcium or barium or both in proper amounts, the balance being aluminum display extremely superior characteristics exceeding 2700 Ahr/Kg. That is, the comparative alloy has the current capacity of 2520 Ahr/Kg, while the second alloys of the present invention each has the current capacity exceeding 2700 Ahr/Kg. The second alloys having particularly effective compositions were observed to indicate the current capacity exceeding 2800 Ahr/Kg and hold a sufficiently base potential.

TABLE 2

| Alloy composition (%) | | | | | | | Current capacity (Ahr/Kg) | Anode potential after 240 hr (mV, SCE) | Remarks |
|---|---|---|---|---|---|---|---|---|---|
| Al | Zn | In | Mg | Si | Ca | Ba | | | |
| Bal. | 2.5 | 0.02 | 2.5 | — | — | — | 2520 | −1080 | Comparative alloy (Japanese Patent Pub. No. 14291/67) |
| Bal. | 2.5 | 0.02 | 2.5 | 0.05 | 0.1 | — | 2595 | −1080 | |
| Bal. | 2.5 | 0.02 | 2.5 | 0.07 | 0.1 | — | 2725 | −1095 | Our second alloy |
| Bal. | 2.5 | 0.02 | 2.5 | 0.16 | 0.1 | — | 2800 | −1100 | Our second alloy |
| Bal. | 2.5 | 0.02 | 2.5 | 1.0 | 0.1 | — | 2740 | −1095 | Our second alloy |
| Bal. | 2.5 | 0.02 | 2.5 | 1.5 | 0.1 | — | 2590 | −1060 | |
| Bal. | 2.5 | 0.02 | 2.5 | 0.05 | — | 0.1 | 2590 | −1095 | |
| Bal. | 2.5 | 0.02 | 2.5 | 0.07 | — | 0.1 | 2715 | −1100 | Our second alloy |
| Bal. | 2.5 | 0.02 | 2.5 | 0.21 | — | 0.1 | 2810 | −1100 | Our second alloy |
| Bal. | 2.5 | 0.02 | 2.5 | 1.0 | — | 0.1 | 2735 | −1090 | Our second alloy |
| Bal. | 2.5 | 0.02 | 2.5 | 1.5 | — | 0.1 | 2580 | −1045 | |
| Bal. | 2.5 | 0.02 | 2.5 | 0.21 | 0.005 | — | 2575 | −1095 | |
| Bal. | 2.5 | 0.02 | 2.5 | 0.21 | 0.01 | — | 2725 | −1100 | Our second alloy |
| Bal. | 2.5 | 0.02 | 2.5 | 0.21 | 0.1 | — | 2820 | −1100 | Our second alloy |
| Bal. | 2.5 | 0.02 | 2.5 | 0.21 | 0.5 | — | 2740 | −1090 | Our second alloy |
| Bal. | 2.5 | 0.02 | 2.5 | 0.21 | 1.0 | — | 2600 | −1055 | |
| Bal. | 2.5 | 0.02 | 2.5 | 0.21 | — | 0.005 | 2600 | −1100 | |
| Bal. | 2.5 | 0.02 | 2.5 | 0.21 | — | 0.01 | 2720 | −1100 | Our second alloy |
| Bal. | 2.5 | 0.02 | 2.5 | 0.21 | — | 0.5 | 2755 | −1095 | Our second alloy |
| Bal. | 2.5 | 0.02 | 2.5 | 0.21 | — | 1.0 | 2590 | −1050 | |
| Bal. | 2.5 | 0.02 | 2.5 | 0.21 | 0.004 | 0.004 | 2660 | −1090 | |
| Bal. | 2.5 | 0.02 | 2.5 | 0.21 | 0.005 | 0.005 | 2800 | −1095 | Our second alloy |
| Bal. | 2.5 | 0.02 | 2.5 | 0.21 | 0.05 | 0.05 | 2825 | −1100 | Our second alloy |
| Bal. | 2.5 | 0.02 | 2.5 | 0.21 | 0.3 | 0.2 | 2805 | −1090 | Our second alloy |
| Bal. | 2.5 | 0.02 | 2.5 | 0.21 | 0.4 | 0.4 | 2595 | −1050 | |

It is clear from synthesis of various characteristics proved by Examples of the present application that the alloys of the present invention, when used for aluminum alloy anodes, each displays a high current capacity which has not been obvious over conventional alloys and possesses characteristics enough to ensure a long-run stable use. Therefore, the alloys of the present invention should be said to be alloys for galvanic anode which are exceedingly advantageous and useful for holding large-sized steel structures at cathodic protection for a long period without employing any special maintenance.

What is claimed is:

1. An aluminum alloy for a galvanic anode which contains 1.0 to 10% zinc, 0.1 to 6% magnesium, 0.01 to 0.04% indium, 0.005 to 0.15% tin 0.09 to 1.0% silicon, 0.005 to 0.45% barium or a mixture of barium and calcium, and the balance being aluminum.

2. An aluminum alloy for a galvanic aniode which contains 1.0 to 10% zinc, 0.01 to 0.05% indium 0.05 to 6% magnesium 0.07 to 1.0% silicon, 0.01 to 0.5% barium or a mixture barium and calcium, and the balance being aluminum.

3. Aluminum alloy for galvanic anode according to claim 2 which contains both calcium and barium, the content of each element being 0.005 to 0.3%, the total content thereof being 0.01 to 0.5%.

* * * * *